B. CHAMBERS.
MOVABLE BREECH FOR FIREARMS.
No. 236. Reissued Apr. 19, 1853.
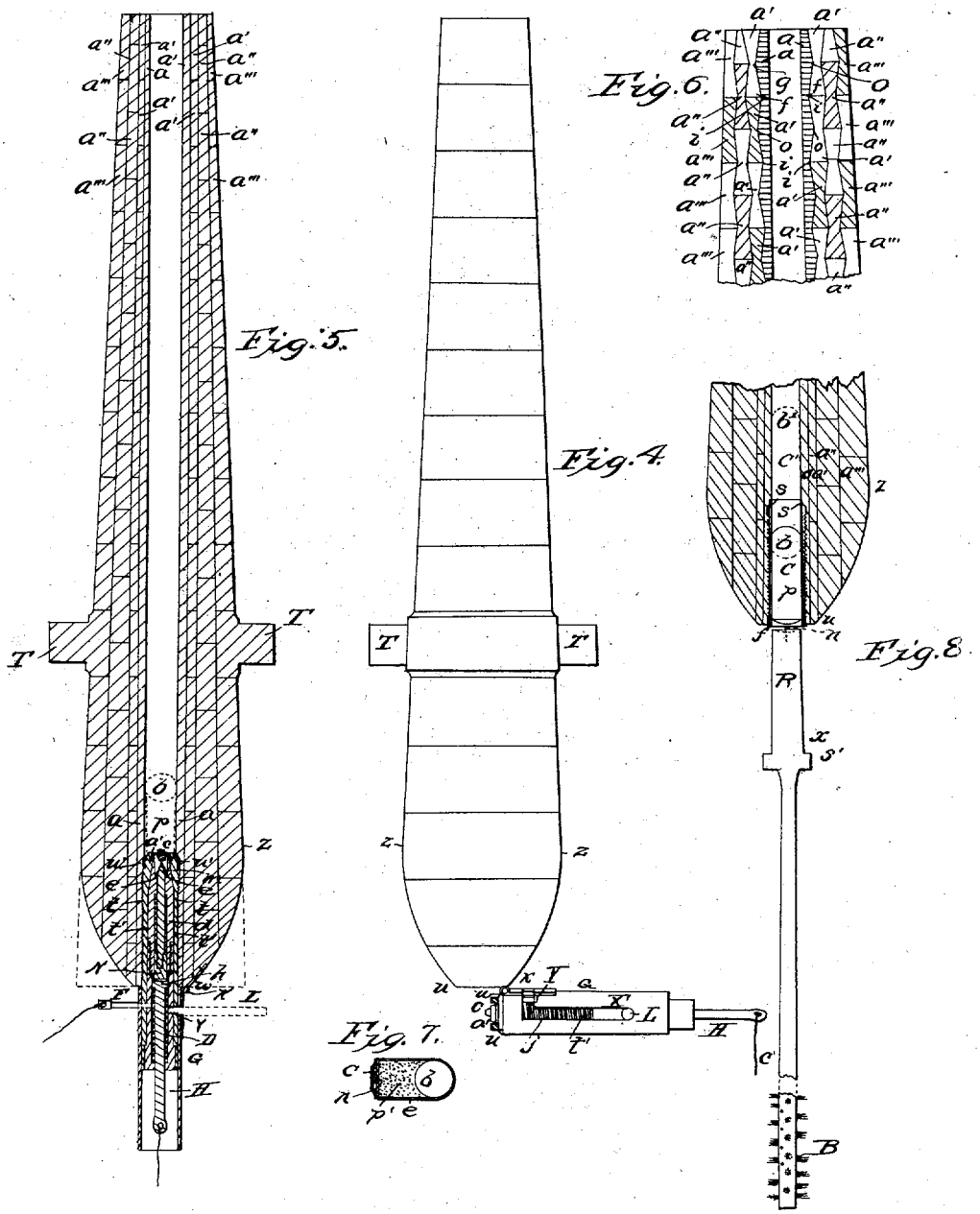
THE NORRIS PETERS CO., PHOTO-LITHO., WASHINGTON, D. C.

UNITED STATES PATENT OFFICE.

BENJAMIN CHAMBERS, OF WASHINGTON, DISTRICT OF COLUMBIA.

IMPROVEMENT IN MOVABLE BREECHES FOR FIRE-ARMS AND APPURTENANCES OF THE SAME.

Specification forming part of Letters Patent No. 6,612, dated July 31, 1849; Reissue No. 236. dated

*To all whom it may concern:*

Be it known that I, BENJAMIN CHAMBERS, of the city and county of Washington, and District of Columbia, have invented a new and useful Improvement in Cannon; and I do hereby declare the following to be a full, clear, and exact description of the same, reference being had to the accompanying drawings, making a part of this specification.

The nature of my invention consists in combining with a hinged breech-piece the support, slot, and lever, whereby the said breech-piece is easily moved into and out of place in closing and opening the gun for the purpose of loading, swabbing, &c.; also, in combining with a gun having a dissected breech the flanged shield, through which the cartridge is made to pass into the chamber over the dissected screw without danger of being broken by the ends and edges of the threads; also, the enlargement near the shoulder of the rammer, whereby the shield through which the cartridge has been rammed is made to adhere by friction to the rammer and to be drawn out of the breech of the gun without requiring a second operation for taking it out; and, lastly, the perforated point or nipple on the percussion-cap.

To enable others skilled in the art to make and use my invention, I will proceed to describe the same with reference to the drawings.

The material of my cannon is wrought-iron. I am aware that this material has been already employed in various ways for the purpose of constructing heavy ordnance; that staves of iron and hoops of the same material have been put together in alternate layers until a cylindrical or conical mass of suitable magnitude had been produced; that solid masses have been forged and subsequently bored out to the required interior size; that a series of rings have been piled up and held together, with bolts passing through them lengthwise of the gun, and fastened at each end by screw-nuts or with straps running fore and aft on the outside; also, that flat rings have been made separately and welded together into a pile of sufficient height to constitute the length of the gun. I am aware that serious objections have in practice been found to exist against all these modes of forming wrought-iron cannon, and I have devised the following, which I consider decidedly preferable to any hitherto in use.

To obviate the danger of crystallizing the iron by welding it in large masses, I form my cannon of pieces of moderate thickness only, commencing with the tube *a a*, as seen in section at figures numbered 5, 6, and 8, the interior of which tube is the bore of the gun, and the outside is turned to receive a series of rings, *a′ a′*, &c., which have an interior diameter such that they will not, when cold, pass onto the tube *a*, but when heated will readily slip on and come to the required position. I avoid too great a heat for the purpose of preventing oxidation of the rings, and determine the diameter of the interior of the rings as compared with that of the exterior of the tube on the principle of the law of expansion of wrought-iron, which I compute at about seven-millionths parts of its diameter for every degree Fahrenheit to which it is heated above the freezing-point of water. Having shrunk the rings *a′ a′*, Fig. 5, upon the barrel *a*, I put on, in a similar manner, by heating and shrinking, the rings *a″ a″*, so as to break joints with the rings *a′ a′*, and when a greater number of courses of rings is necessary they are placed on the preceding series in the same manner as the second series is placed upon the first—that is, so as to break joints with each other. The rings may all be prepared separately and finished ready to be put together, or when one set has been placed upon the barrel *a* throughout its length the piece thus formed may be placed in a lathe and the exteriors of the rings turned altogether, so as to receive the next tier of rings.

Instead of turning the barrel *a*, Figs. 5 and 8, of a cylindrical form and shrinking on the rings *a′ a″*, &c., with so much tension as to make them adhere firmly by the mere friction thereby created, I shall in some cases, either in whole or in part, turn the barrel *a* as represented in Fig. 6, having alternately elevated portions *o o* and depressed portions *i i*. To fit these elevations and depressions the rings *a′ a′* will be formed on their inner sides with reverse depressions and elevations, answering to the ridges and cavities turned on *a*. The edge *f* of the ring *a′* is of such interior diameter that it will not, when cold, pass over the ridge *o* on the barrel *a*; but when heated to the proper temperature, it will come into place, and then the contraction of the metal brings *f* into firm contact with *i*, and *g* into contact with *o*, leaving the barrel at all parts firmly gripped by the rings, but not so straining the latter, as to diminish, essentially, the tenacity of the ring when cold. In deciding how high the elevations may be made consistently with ease in getting on the rings and with due adhesion after they are cold, I calculate the expansion at the temperature used in putting on the rings, and ascertain and give to the diameters at *o* and at *i* the same relations as the ring *a'* will have to the edge *f* in its hot and cold states, respectively; but in turning the rings *a'*, I leave their interior diameters in the respective parts slightly less than that of the barrel at the parts on which they are severally to be set. This is for the purpose of having every part of the ring when cold brought into a moderate tension, but not overstrained.

By means of the rate above stated for the expansion of iron by heat, and assuming the temperature of 1,000° above the freezing-point at which the rings might be able to pass onto the barrel, I find that if the ring have its edge *f* a diameter of six inches when cold, its diameter at *g* (and that of the barrel *o*) may be made $\frac{7}{1000000}\times1,000\times6=\frac{42}{1000}$ of an inch more in diameter than at *i*, or it may be 6.042 inches in diameter. As successive rings are put on, the relative diameters at the depressed and at the elevated parts of the interior and of the exterior rings will remain the same as above; but the absolute heights of the ridges over which the edges of the rings must pass will increase in proportion as the diameter increases. The exterior peripheries of all the series of rings, except the last, have depressions *o'* turned on their middle parts, which depressions are to receive the ends of the next series of rings, *a''*. The last series, *a'''*, Fig. 4, will be turned off to the regular conical form of the finished cannon.

The trunnions T T, Fig. 5, are forged with one of the outside rings, which, for the purpose of strengthening the connection, may be made thicker than the other exterior rings.

It is not necessary that all the rings composing a cannon should be made of the same diameter for the same series; but they may increase gradually from the muzzle toward the breech end of the cannon, as represented in Figs. 4, 5, 6.

That portion of my cannon near the breech is tapered to a greater extent than has been generally customary. This part is represented in Figs. 4, 5, and 8 by the curved line *z w*. The firing of the cartridge is made to take place at *c*, Fig. 5, about opposite to the point *z*, and where the diameter of the gun is greatest.

My cannon is so constructed as to be opened and loaded at the breech. For this purpose from the rear end of the gun at *w* may be cut, in the interior of the barrel *a*, a thread of a screw, *t*, Fig. 5, in order to receive the male screw *t'*, Figs. 4, 5. The manner in which the breech-piece is withdrawn for the purpose of charging the cannon is seen at G, Fig. 4, where *k* is a hinge, about which, G, the barrel containing the breech-piece vibrates horizontally by turning the lever L, Fig. 4, from a horizontal to a vertical position, and pushing it back to the end of the slot near Y'; and in order that this pushing back of L may be possible, the female screw *t t*, Fig. 5, is about one-half cut away with the barrel *a*, being removed longitudinally on alternate portions of the periphery. By this arrangement of the threads the male screw on the breech-piece slides with its remaining sections of threads of the female screw until the conical part *u* of the breech-piece, Fig. 4, comes into contact with the seat *u'*, Fig. 5. This sliding is effected by pushing forward the lever L in the slot J until it comes to the vertical or cross slot Y, when by a partial turn to the right, as seen at L, Fig. 5, the threads of the male screw take into those of the female screw, and with accuracy close the chamber of the gun. In order to open the gun to deposit a charge, first turn L up into a vertical position, so that the segments of screws may slide out, draw it backward to the end of the slot J, and then swing G around on the hinge *k*, as above described.

Fig. 8 represents the manner of placing the charge in the chamber of my cannon. C is the cartridge within a thin cylindrical metallic shield, *s*, of sufficient length to reach from the rear extremity of the gun to a point where the forward end of the screw *t*, Fig. 5, terminates, and where the chamber of the gun commences. This shield has an enlargement in the form of a flat ring or flange, *f*, at the rear end, which prevents it from passing beyond the necessary distance into the gun. The cartridge being placed in the shield, the latter is slipped into the breech of the gun. The rammer R, having a shoulder, *s'*, adjusted to arrest its motion when it comes against the flange *f* of the shield, is then used to push the cartridge through the shield to the position indicated by the dotted figure C'. The rammer has near the shoulder *s'* a little enlargement of the cylinder seen at *x*, whereby the shield is made to adhere to the rammer by friction and to be withdrawn from the breech. At the extremity of the rammer R is a projecting point, called a "perforator," which, while pushing the cartridge, penetrates the envelope and opens a direct passage for the nipple *c* on the cap, Figs. 4 and 5, to enter. When the plate-cap is attached to the cartridge, however, this point becomes unnecessary, and the end of the rammer is left plain, or may be slightly concave, so as not to press with great force against the cap in the center of the end of the cartridge. When the gun has been discharged, the swab or brush B is inserted at the breech and driven quite through to the muzzle. During this operation the shield *s* may also be inserted in the breech, so as to defend the screw from any deposit of impurity upon the threads of the screw.

Having thus fully described the nature of my invention, what I claim therein as new, and desire to secure by Letters Patent, is—

1. In combination with a hinged breech-piece, the support G, the slot Y, and lever L, whereby the said breech-piece is easily moved into and out of place in closing and opening the gun for the purpose of loading, swabbing, &c., substantially as described.

2. In combination with a gun having a dissected screw-breech, the flanged shield through which the cartridge is made to pass into the chamber over the dissected screw without danger of being broken by the ends and edges of the threads, as herein set forth.

3. In combination with a rammer for charging guns at the breech, the projecting central point, *n*, whereby the cartridge in being driven to its place in th chamber is perforated at its base to receive the point of the percussion-cap herein described, for the purpose of insuring the ignition of the gunpowder, as set forth.

4. The enlargement *x*, near the shoulder *s'* of the rammer, whereby the shield through which the cartridge has been rammed is made to adhere by friction to the rammer and to be drawn out of the breech of the gun without requiring a separate operation for taking it out.

I wish it to be understood that in these claims I shall not confine myself to the exact arrangement of parts herein described, but shall vary the same at pleasure while I attain the same ends by means substantially the same.

B. CHAMBERS.

Witnesses:

A. B. STOUGHTON,
SAML. GRUBB.